(12) United States Patent  
Chan et al.

(10) Patent No.: US 8,500,053 B2
(45) Date of Patent: Aug. 6, 2013

(54) FOOD PROCESSOR BOWL COVER DYNAMIC SEALING ASSEMBLY

(75) Inventors: Chi Tong Chan, Chaiwan (HK); Joseph J Laskowski, Derby, CT (US); Charles Z Krasznai, Bridgeport, CT (US)

(73) Assignee: Conair Corporation, Stamford, CT (US)

( * ) Notice: Subject to any disclaimer, the term of this patent is extended or adjusted under 35 U.S.C. 154(b) by 183 days.

(21) Appl. No.: 12/883,942

(22) Filed: Sep. 16, 2010

(65) Prior Publication Data

US 2011/0174905 A1 Jul. 21, 2011

Related U.S. Application Data

(60) Provisional application No. 61/243,799, filed on Sep. 18, 2009.

(51) Int. Cl.
*A47J 43/07* (2006.01)

(52) U.S. Cl.
USPC .................................................... 241/282.1

(58) Field of Classification Search
USPC .............. 241/37.5, 92, 282.1, 282.2; 220/287
See application file for complete search history.

(56) References Cited

U.S. PATENT DOCUMENTS

2011/0079596 A1* 4/2011 Krasznai et al. .............. 220/287

* cited by examiner

*Primary Examiner* — Mark Rosenbaum
(74) *Attorney, Agent, or Firm* — McCormick, Paulding & Huber LLP

(57) ABSTRACT

A lid 1 that is adapted to cover a food processor bowl 2 has a flexible sealing ring assembly 3 that is mounted to a lower surface of the lid 1, along the perimeter. The sealing assembly 3 includes resilient springs 4 that compress and relax in order to provide a downwardly biased force between the sealing assembly 3 and the upper rim 5 of a bowl 2 to which the lid 1 is mounted.

9 Claims, 1 Drawing Sheet

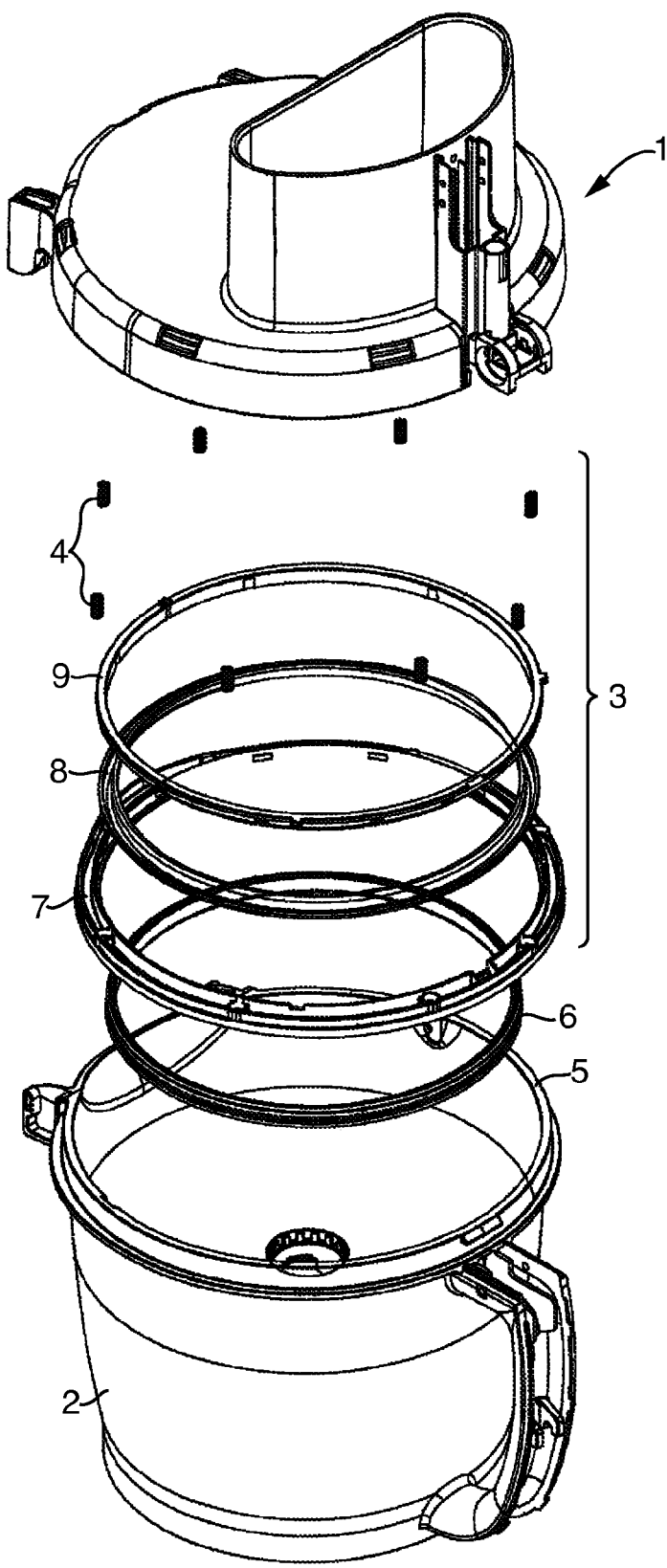

FOOD PROCESSOR BOWL COVER DYNAMIC SEALING ASSEMBLY

CROSS-REFERENCE TO RELATED APPLICATIONS

This application relates to and claims priority from U.S. Provisional Application 61/243,799.

BACKGROUND OF THE INVENTION

The present invention relates to food preparation appliances and, more particularly, to countertop food processor appliances.

DESCRIPTION OF RELATED ART

Countertop food processor appliances generally comprise a base, a motor housed in the base, a bowl mounted on the base for receiving food product to be mixed or chopped, a blade rotationally driven by the motor and positioned in the bowl for rotation therein, and a cover or lid for the bowl. An electrical cord extends from the base and is adapted to be plugged into an external electrical source such as a wall socket to deliver electrical energy to the motor.

Countertop food processors typically include a lid that must be locked into place on the bowl in order to activate a switch enabling operation of the motor. This is a safety precaution, though certain sizes and configurations of food processor are inherently safe without such locking a switching arrangement. Another reason lit is desirable to lock lids to food processor bowls is to store and protect food contents inside a bowl without the possibility of the lid falling off or opening. Because of the rigid nature and fixed size of food processor bowls and, if applicable, the locking and switching mechanisms that are part of such bowls, it is necessary for each bowl to have its own lid in order to achieve a secure locking fit. It would be convenient and efficient, however, to provide a single lid that functionally covers more than one size bowl, particularly a plurality of bowls that are nested during use with a food processors.

OBJECT OF THE PRESENT INVENTION

It is an object of the present invention to provide a food processor bowl cover sealing assembly that enables a single lid to functionally cover more than one size bowl, particularly a plurality of bowls that are nested during use with a food processors.

SUMMARY OF THE INVENTION

According to the present invention, a lid adapted to cover a food processor bowl has a flexible sealing ring that is mounted to a lower surface of the lid, along the perimeter, and mounted thereto by resilient springs that compress and relax in order to provide a downwardly biased force between the sealing ring and the upper lip of a bowl to which the lid is mounted.

BRIEF DESCRIPTION OF THE DRAWING

FIG. 1 is an exploded view of a preferred embodiment of the present invention.

DESCRIPTION OF THE PREFERRED EMBODIMENT OF THE PRESENT INVENTION

Referring to FIG. 1, a lid 1 that is adapted to cover a food processor bowl 2 has a flexible sealing ring assembly 3 that is mounted to a lower surface of the lid 1, along the perimeter. The sealing assembly 3 includes resilient springs 4 that compress and relax in order to provide a downwardly biased force between the sealing assembly 3 and the upper rim 5 of a bowl 2 to which the lid 1 is mounted. A resilient sealing ring 6, which may be made of silicone rubber or a suitable elastomer, is configured of an inner diameter and an outer diameter that enable the ring 6 to contact the upper edge of the rim 5 or rims of one or a plurality of food processor bowls 2 in a sealing manner. In cross-section the ring 6 may have one or more wiper edges for resiliently engaging the upper surface of the rim 5.

The sealing ring 6 is in contact with the lower surface of a rigid dynamic ring 7. The seating ring's lower surface may include a groove in which the sealing ring 6 is received. The upper surface of the dynamic ring 7 is adapted to contact a plurality of resilient springs 4 that are spaced along the dynamic ring 7. The upper surface of the dynamic ring 7 may have bosses and/or grooves for the purpose of securing or locating the springs 4 with respect to the dynamic ring 7. The other side of each of the springs 4 contacts the lower surface of the lid 1. The lid 1 may be provided with bosses and/or grooves for the purpose of securing or locating the springs 4 with respect to the lid 1. This enables the dynamic ring 7 to transmit force between the lid 1 and the sealing ring 6 in order to press the sealing ring 6 into sealing contact with the rim 5 of the bowl 2 when the lid is installed.

A stationary ring 8 is attached to the lower surface of the lid 1 and is sized with an outside diameter that is slightly smaller than the inside diameter of the dynamic ring 7. The outer circumferential surface of the stationary ring 8 is in sliding contact with the inner circumferential surface of the dynamic ring 7, in a manner in which relative movement between the two is facilitated when the dynamic ring 7 moves up and down compressing and decompressing the springs 4. Either or both surfaces of the stationary ring 8 and the dynamic ring 7 may be flexible or semi-flexible to permit sliding contact while maintaining a seal therebetween. The stationary ring 8 is attached to the lid 1 by a retention ring 9 that is configured and sized to lock the stationary ring 8 relative to contours on the lower surface of the lid 1.

Because the dynamic ring 7 and sealing ring 6 are adapted to move vertically with respect to the lid 1, the lid 1 can be fitted, in sealing engagement, over one or more bowls/The bowls can be nested, or used separately, since the range of movement of the rings 6 and 7 facilitated by the design accommodates the variation in height, and the springs 4 provide sealing engagement of the sealing ring 6 to the bowl rims.

While the preferred embodiment of the present invention has been disclosed herein, it is understood that various modification can be made without departing from the scope of the presently claimed invention.

What is claimed is:

1. A food processor bowl cover sealing assembly that enables a single lid to functionally cover a plurality of food processor bowls of varying sizes when used either alone or used simultaneously in nested fashion, said assembly comprising
    a lid adapted to cover a food processor bowl;
    a flexible sealing ring assembly that is mounted to a lower surface of the lid, along the perimeter of said lid, said sealing ring assembly including a dynamic ring having a groove in a lower surface thereof and a resilient sealing ring received in said groove; and
    a plurality of resilient springs mounted between said dynamic ring and said lid that compress when said lid is closed over a bowl in order to provide a downwardly biased force between the resilient sealing ring and the upper lip of the bowl to which the lid is mounted.

2. An assembly according to claim 1, wherein
said sealing ring is made of an elastomer and is configured of an inner diameter and an outer diameter that enable the ring to contact the upper edge of the rim or rims of one or a plurality of food processor bowls of varying diameter, each in a sealing manner.

3. An assembly according to claim 2, wherein
said sealing ring is made of silicone.

4. An assembly according to claim 2, wherein
said sealing ring has a plurality of wiper edges for resiliently engaging the upper surface of a rim of a bowl.

5. An assembly according to claim 1 further comprising
a plurality of either bosses or grooves for the purpose of securing and locating the springs with respect to the dynamic ring such that the springs are compressed between said dynamic ring and said lid.

6. An assembly according to claim 5, further comprising
a plurality of either bosses or grooves on the lower side of said lid for the purpose of securing and locating said springs with respect to said lid.

7. An assembly according to claim 1 further comprising
a stationary ring attached to the lower surface of said lid and sized with an outside diameter that is slightly smaller than the inside diameter of the dynamic ring;
a outer circumferential surface of the stationary ring that is in sliding contact with the inner circumferential surface of said dynamic ring, in a manner in which relative movement between the two is facilitated when the dynamic ring moves up and down compressing and decompressing said springs.

8. An assembly according to claim 7, wherein
either or both surfaces of said stationary ring and said dynamic ring may be flexible or semi-flexible to permit sliding contact while maintaining a seal therebetween.

9. An assembly according to claim 7, further comprising
a retention ring for attaching said stationary ring to said lid.

\* \* \* \* \*